Oct. 16, 1973    J. M. McQUADE    3,766,117
METHOD OF MAKING A DISPERSION FROM POLYAMIDE-ACID
Filed March 12, 1970
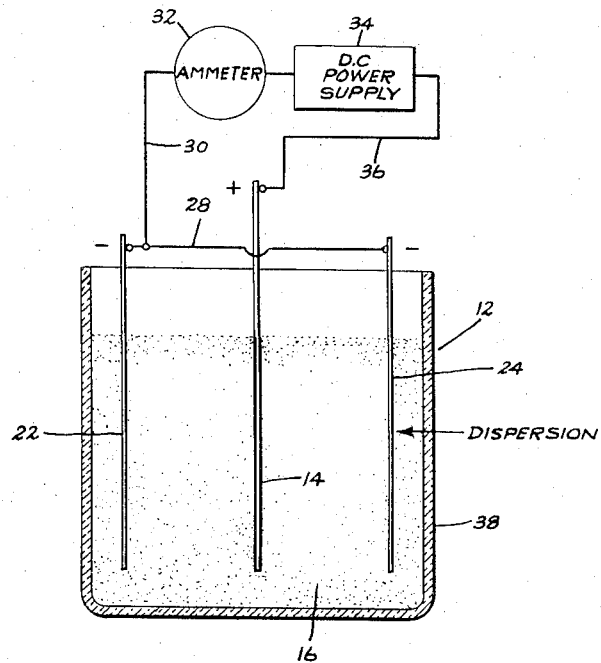
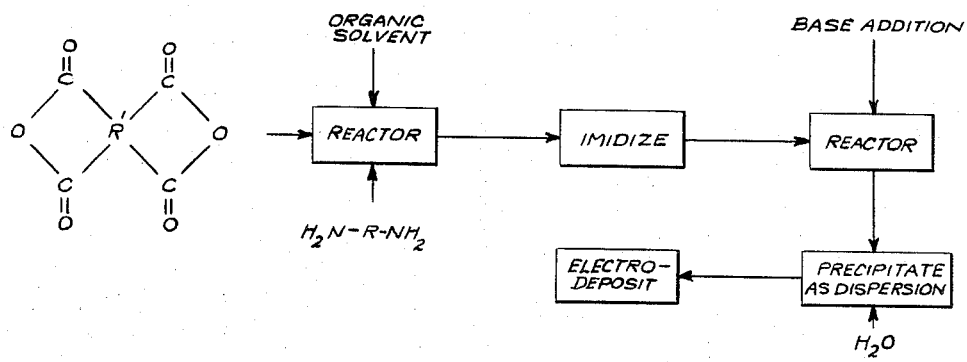
INVENTOR.
James M. McQuade United States Patent Office 3,766,117
Patented Oct. 16, 1973

3,766,117
METHOD OF MAKING A DISPERSION FROM POLYAMIDE-ACID
James M. McQuade, Fort Wayne, Ind., assignor to General Electric Company
Filed Mar. 12, 1970, Ser. No. 18,817
Int. Cl. C08g 20/24; C23b 13/00
U.S. Cl. 260—29.2 N
6 Claims

ABSTRACT OF THE DISCLOSURE

A preparation of electrodepositable polyamic acid is prepared within an organic solvent system, which is substantially water free, and is imidized to yield the desired viscosity. The polyamic acid is then treated with a base to render it at least partially water soluble and water is then added to precipitate at least a portion of the polyamic acid as a dispersion within the continuous phase consisting essentially of organic-and-water solvents which are miscible. The dispersion is stable and is electrodepositable to form films in thicknesses heretofore unattainable. The amount of base added is sufficient to preclude a curding of the polyamic acid upon the addition of water and yet such base addition is not so great as to produce total solubility of the polyamic acid upon the addition of the water.

The amount of polyamic acid in the continuous phase should not exceed 3% by weight of the continuous phase on an absolute basis.

BACKGROUND OF THE INVENTION

Those skilled in the art have attempted to electrodeposit polyamic acid resins from solutions but have encountered certain inherent limitations regarding the thickness to which the electrodeposits can be effected. After a certain thickness occurs, there is a rapid reduction of current flow which limits further electrodeposition thus limiting the extent of build-up of the coating. For many applications, the coating thickness requirement exceeds the maximum which can be obtained utilizing the electrocoating procedures of the prior art.

Because of the limitations of electrocoating, lacking as it is, in the extent to which a satisfactory build-up can occur, desired coating thicknesses have been achieved generally by a dip-and-dry technique in which the resin is successively coated upon magnet wire (or other substrate). By a process of successive passes through an aqueous solution of the polymer, followed by drying and coating, the desired build-up will occur.

Because of the many advantages of electrodepositing a substrate, as compared with the dip-and-dry technique, there have been many efforts made to overcome the deficiencies described, since electrocoating offers the possibilities of faster operation, a simplification in the apparatus over the conventional dip-and-dry technique, and the many controls which electrocoating offers to produce an end product of precise qualities. In spite of such efforts, the prior art has not produced stable electrodepositable preparations of polyamic acid which can be electrodeposited to a preferred thickness.

OBJECTS OF THE INVENTION

The foremost object of the present invention is to provide a preparation of electrodepositable polyamic acids as a stable dispersion within a miscible organic-and-water system, which will electrodeposit to thicknesses heretofore unobtainable.

Another object of the present invention is to provide a preparation of electrodepositable polyamic acid and a process for electrodepositing such preparation to produce films of greater thickness and uniform quality wherein the coating is relatively free of pinholes and other irregularities within the coating.

Another object of the present invention is to provide an improved preparation for electrocoating substrates in which the preparation comprises a dispersion of polyamic acid as a discontinuous phase and a portion of such polyamic acid is in solution or continuous phase, the two such phases of polyamic acid being proportioned to yield electrocoatings of greater thickness and uniform quality.

Another object of the present invention is to provide a preparation of electrodepositable polyamic acid, a portion of such polyamic acid being in a dispersed phase, formed by adding water to an organic solution. The polyamic acid is treated with a base and thereafter converted to a precipitated dispersed phase and a soluble second phase within the organic-and-water solvent.

Other objects and features of the present invention will become apparent from a consideration of the following description which proceeds with reference to the accompanying drawings.

DRAWINGS

FIG. 1 is a schematic view of the electrocoating apparatus which is usable in the present invention; and
FIG. 2 is a block diagram showing the procedure for making the electrodepositable preparation in accordance with the invention.

GENERAL DISCUSSION OF THE INVENTION

The main purpose of this invention is to provide a preparation of polyamic acid which can be electrodeposited to greater thicknesses than was previously obtainable. The preparation is made in accordance with my copending application Ser. No. 18,818, filed Mar. 12, 1970 entitled "Electrodeposition of Resins From Aqueous Dispersions" assigned to the same assignee as the present application, and now abandoned.

The preparations disclosed in this application are stable dispersions of polyamic acid which are electrodepositable upon a substrate and are then cured to a polyimide to form excellent insulation coatings on products such as magnet wire or the like. The resultant coating is found to be of uniform quality and is free of pinholes or other defects.

In making the preparation, I use a substantially water free anhydrous organic solvent and the coating preparation is obtained by interreacting benzophenonetetracarboxylic dianhydride (BPDA) together with a diamine, such as methylene dianiline (MDA) in which care has been taken to eliminate any free acid within the BPDA.

The BPDA and MDA are reacted together in accordance with the following reaction:

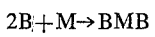

and

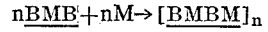

and the reaction product is then endcapped or terminated by adding additional M in accordance with the reaction $[BMBM]_n + M \rightarrow M[\underline{BMBM}]_n$. The reaction product may be represented by the formula:

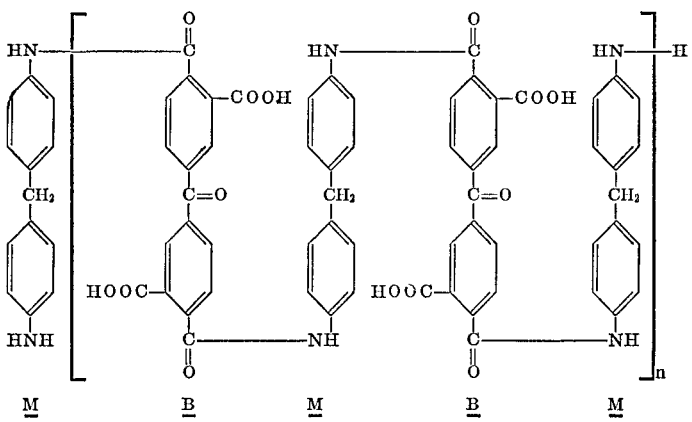

The foregoing reactions occur within an anhydrous system of NMP.

I next add an amount of base material in sufficient amount so that approximately 4% of the carboxylic radicals on the polymer chain are neutralized in accordance with the reaction 4% being minimum, 80% being maximum:

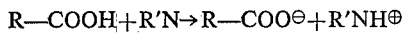

The method of preparation of the polyimide prepolymer is fully set forth in co-pending application Ser. No. 851,835, filed Aug. 21, 1969 (03–LO–4114) now Pat. No. 3,652,500 entitled "Improved Process for Producing Polyamide Coating Materials by Endcapping," invented by Marvin Arthur Peterson, and assigned to the same assignee as the present application.

The amount of the base added is dictated by two general considerations: (1) enough base must be added so that upon the addition of water the entirety of the polyimide will not be dropped completely out of solution in the form of heavy curds and the like which are impractical for electrodeposition and yet (2) not so much base be added that the resulting polymer is completely water soluble as for example, in the manner taught by co-pending application Ser. No. 803,037, filed Feb. 27, 1969 (03–LO–3253) entitled "Improved Process for Producing Coating Materials," invented by Marvin Arthur Peterson, and assigned to the same assignee as the present application. The goal is to add enough base so that when the system is converted from an organic solvent base to a mixed water base and organic solvent base the polyamic acid or other resin material is converted to a milky white dispersion with particle sizes of approximately 0.5 micron or less.

The reason I prefer to use a minimum amount of base to accomplish a dispersion is that the base seems to have a deterrent effect on the maximum amount of coating that can be obtained. Also, I have found that not all bases are equivalent with respect to noninterference with electrodeposition. Although this is the case, I am unable to answer why it so occurs on any acceptable theoretical basis. Nevertheless, I found that such compounds as alkanol amines are preferred, and I can further establish that the less the amount of base used, the thicker the coatings are obtainable by electrodeposition, bearing in mind of course that sufficient base must always be used to prevent the resin from dropping out of the organic solution entirely upon converting the system from an organic solvent base to a combination water and organic solvent base.

Materials which I have produced in accordance with this invention are stable aqueous dispersions, and I can electrodeposit films in excess of 1 mil per side of substrate. The wet strength of the electrodeposited film appears to be very good, i.e., it is adherent and cohesive and the cured film can pass a 25% elongation and can be wound on its own diameter without injuring the coating.

Materials which I can coat will vary considerably and may consist of copper, aluminum, tin, zinc, iron and alloys of these materials.

I have also found that it is advantageous to include a wetting agent such as nonylphenol ethylene oxide adduct which will permit the dispersion to flow uniformly over the surface of the anode and results in void free deposits. Other wetting (or dispersing) agents which are satisfactory for this purpose consist of carboxy propyl terminated dimethylsiloxanes with a molecular weight of about 1000. It is essential that voids be prevented in the coating for these will otherwise cause poor dielectric strength in the finished product. Typically, when the wetting agent consists of the siloxane, it produces a surface tension in the order of 40 dynes per centimeter or less.

I have further found that the larger the molecular weight of the resin polymer the less base is required to form a dispersion and consequently a better coating is obtainable both in terms of thickness and coulombic efficiency with high molecular weight resins.

Larger molecular weights are obtainable by following the teaching of co-pending application Ser. No. 822,899, filed May 8, 1969 (03–LO–3828) entitled "Improved Process for Producing Wire Coatings From Prepolymeric Materials," invented by Marvin Arthur Peterson, and assigned to the same assignee as the present application.

After the polyamic acid is produced, it can be heat treated to imidize the polymer to the correct degree providing the viscosity which is best suited for electro-coating. Details of imidization including the reaction conditions are fully set forth in co-pending application Ser. No. 822,899 mentioned above.

In the following description considerations such as usable resin systems are treated under the headings "Resin System," "Aromatic Dianhydride," and "Organic Diamine"; the solvent used is identified under the heading "Solvent"; the base is identified under the heading "Base Addition"; the factors affecting electrodeposition such as the amount and type of base, the percent dispersion, are also identified and marked for convenience. The Electrocoating Apparatus, the Working Examples, General Considerations and the Summary are also marked out under the appropriate headings.

POLYAMIC ACID SYSTEM

The resin system is derived from recurrent units having carboxylic acid pendant groups which are reactable with a base to render the polymer only partially water soluble and which is later formed into a dispersion upon adding water. The resin system is derived from, by way of general formula:

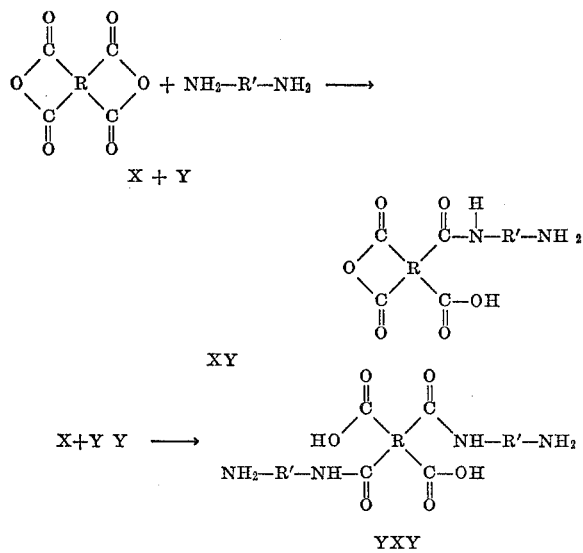

Where R is a tetravalent radical having benzenoid unsaturation and R' is a divalent radical. More specifically as an example of the resin system, there is used 3,3',4,4'-benzophenonetetracarboxylic dianhydride and 4,4'-methylene dianiline condensation polymer:

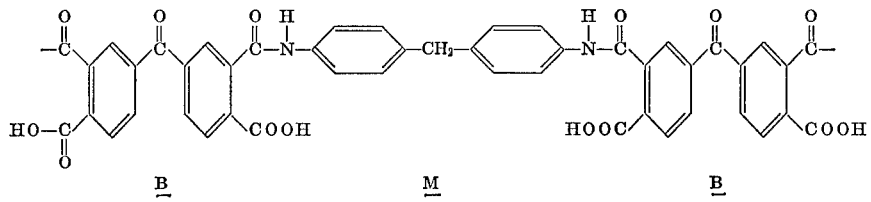

zipped up with M.

Considering the polyimide prepolymer, there is first prepared within a solvent system such as N-methyl-2-pyrrolidone, dimethyl sulfoxide or the like, a precursor molecule comprised of the reaction product of two moles of tetracarboxylic dianhydride (B) and one mole of diamine (M) to produce a precursor BMB. The reaction may be expressed as:

$$2B + M \rightarrow BMB$$

The precursor known as BMB can be partially imidized prior to "zipping up" the stable precursor units which takes place with addition of M, the latter is accomplished in an environment of dry solvent which may consist of N-methyl-2-pyrrolidone under dry nitrogen at temperatures preferably below 50° C. The detailed conditions of forming the precursor BMB and the imidized forms thereof are amply set forth in co-pending applications Ser. No. 803,037 (supra) and Ser. No. 822,899 (supra).

By adding a slight excess of M there is assured a terminal amine group.

Once a particular viscosity and molecular weight of prepolyimide are optimized to the end product requirements, the polyimide prepolymer is rendered partially water soluble by addition of base and a dispersion then formed by the addition of water.

Typically, the molecular weight of the partially soluble material is greater than 76,000. A preselected range of molecular weight can be achieved in the manner indicated by co-pending application Ser. No. 823,108, filed May 8, 1969 (03-L0-4087) now Pat. No. 3,652,500 entitled "Improved Process for Producing Polyamide Coating Materials," invented by Marvin Arthur Peterson, and assigned to the same assignee as the present application, wherein molecular weight is followed indirectly by means of measuring the inherent viscosity. Preparing the precursor of BMB I zip up the BMB with approximately 1.6% molar excess of M and I then back-titrate with B to the desired molecular weight range which can be narrowly defined and I then endcap with M.

Upon heating the electrodeposited material thus described at a temperature of from about 100° C. to about 500° C. there is produced a finished polyimide of recurring units of the formula:

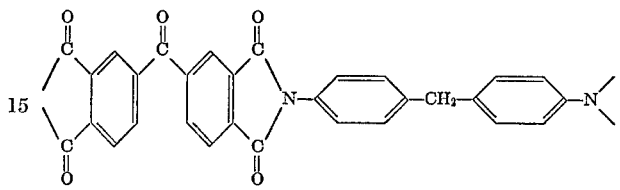

AROMATIC DIANHYDRIDE REACTANT

The aromatic dianhydrides that are useful in the process of this invention are those having the formula:

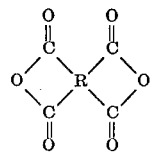

wherein R is an organic tetravalent radical containing at least one ring of 6 carbon atoms and having benzenoid unsaturation, the four carboxyl groups of each unit being attached directly to separate carbon atoms each pair of carboxyl groups being attached to adjacent carbon atoms in a ring of the R radical. These dianhydrides include, for example, pyromellitic dianhydride,
2,3,6,7-naphthalenetetracarboxylic dianhydride,
3,3',4,4'-benzophenonetetracarboxylic dianhydride,
benzene-1,2,3,4-tetracarboxylic dianhydride,
bis(3,4-dicarboxyphenyl) sulfone dianhydride,
bis(3,4-dicarboxyphenyl) methane dianhydride,
bis(2,3-dicarboxyphenyl) methane dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
naphthalene-1,4,5,8-tetracarboxylic dianhydride,
naphthalene-1,2,4,5-tetracarboxylic dianhydride,
3,3',4,4'-diphenyltetracarboxylic dianhydride,
1,2,5,6-naphthalenetetracarboxylic dianhydride,
2,2',3,3'-diphenyltetracarboxylic dianhydride,
2,2-bis(3,4-dicarboxyphenyl) propane dianhydride,
3,4,9,10-phenylenetetracarboxylic dianhydride,
bis(3,4-dicarboxyphenyl) ether dianhydride,
2,2-bis(2,3-dicarboxyphenyl) propane dianhydride,
1,1-bis(2,3-dicarboxyphenyl)ethane dianhydride,
1,1-bis(3,4-dicarboxyphenyl)ethane dianhydride,
and the like.

ORGANIC DIAMINE REACTANT

The organic diamines that are useful in the process of this invention are those having the formula:

$$H_2N-R'-NH_2$$

wherein R' is a divalent radical selected from the class consisting of:

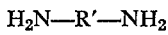

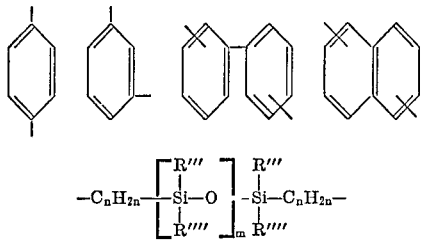

wherein R''' and R'''' are an alkyl or an aryl group having 1 to 6 carbon atoms, $n$ is an integer of from 1 to 4 and $m$ has a value of 0, 1 or more, and

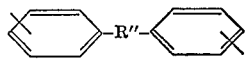

wherein R'' is selected from the group consisting of carbon in an alkylene chain having 1-3 carbon atoms, oxygen, silicon, phosphorous, and sulfur in:

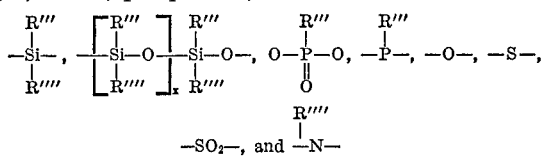

wherein R''' and R'''' are as above-defined and $x$ is an integer including 0.

Specific diamines which are suitable for use in the present invention are:

meta-phenylene diamine,
para-phenylene diamine,
4,4'-diamino-diphenyl propane,
4,4'-diamino-diphenyl methane,
benzidine,
4,4'-diamino-diphenyl sulfide,
4,4'-diamino-diphenyl sulfone,
3,3'-diamino-diphenyl sulfone,
4,4'-diamino-diphenyl ether,
2,6-diamino-pyridine,
bis-(4-amino-phenyl) diethyl silane,
bis-(4-amino-phenyl)phosphine oxide,
bis-(4-amino-phenyl)-N-methylamine,
1,5-diamino naphthalene,
3,3'-dimethyl-4,4'-diamino-biphenyl-3,3'-dimethoxy benzidine,
m-xylylene diamine,
p-xylylene diamine,
1,3-bis-delta-aminobutyltetramethyl disiloxane,
1,3-bis-gamma-aminopropyltetraphenyl disiloxane,
and mixtures thereof.

SOLVENT ADDITION

The solvents useful in the solution phase of this invention are the organic solvents whose functional groups do not react with either of the reactants (the diamines or the dianhydrides) to any appreciable extent. Besides being inert to the system and preferably, being a solvent for the polyamic acid, the organic solvent must be a solvent for at least one of the reactants, and preferably for both of the reactants. The organic solvent is an organic liquid other than either reactant or homologues of the reactants, that is a solvent for at least one reactant. Such solvents include dimethylsulfoxide, N-methyl-2-pyrrolidone, the normally liquid organic solvents of the N-methylcaprolactam, etc. and tetramethylene urea, pyridine, dimethylsulfone, hexamethylphosphoramide, tetramethylenesulfone, formamide, butyrolactone, and N-acetyl-2-pyrrolidone. The solvents can be used alone, as mixtures or in combination with poor solvents such as benzene, toluene, cresylic acid, xylene, dioxane, cyclohexane, or benzonitrile.

It is important in this invention that the reactants and the solvents be essentially anhydrous during the initial condensation reaction in order to prevent hydrolysis of the dianhydride to its acid form which acts as an impurity which lowers the molecular weight. The solvent must be miscible with water and should be non-reactive with the reactants and the polymer.

BASE ADDITION

After the polymer is formed and is in its organic solvent phase, it is essentially acid free, and is polymerized to a molecular weight range and is imidized by the preferred amount, I then react the carboxyl along the polymer chain with a base material as an aqueous or organic solution and which may consist of ammonium hydroxide, dimethylethanolamine (DME), methyldiethanolamine (MDEA), triethanolamine (TEA), triethylamine (TE amine), and diethanolamine (DEA). The amount of base added is that necessary to form a stable dispersion upon the addition of water, i.e., the percent COOH neutralized to achieve the dispersion goal for a specific resin system. I utilize the base in minimum amounts since it has been found that dispersions are of improved electrodepositability when containing minimum amounts of such base addition. The relative amount of such base to form a stable dispersion may be indicated in accordance with the following:

TABLE I.—MINIMUM NUMBER OF MILLIEQUIVALENTS OF VARIOUS BASES TO FORM STABLE DISPERSIONS [1]

| Example No.[2] | Inherent viscosity $\eta$, dl./g. | Morpholine | N-methyl morpholine | DMEA | MDE | DEA | TEA | TE amine | NH₃ |
|---|---|---|---|---|---|---|---|---|---|
| 4 | 0.89 | 3.0 | | 2.0 | | 2.0 | | | |
| 2 | 0.64 | 4.0 | 4.8 | 3.2 | 3.2 | 3.0 | 3.2 | 4.8 | 3.6 |
| 3 | 0.62 | 4.6 | | | 3.2 | | | | |
| 6 | 1.14 | | | | 2.0 | | | | |
| 5 | 1.10 | 2.88 | | | 2.2 | | | | |

[1] 5% solids, 47% NMP, 14% ethylene glycol, 34% water. The amount stated is the minimum amount of base to form a stable dispersion of the resin in an organic-water solvent system. More base can be used but I have found that the minimum base addition produces dispersions which are better for electrodeposition.
[2] See later examples.

NOTE.—DMEA=dimethylethanolamine, MDE=methyldiethanolamine, TEA=triethanolamine, TE amine=triethylamine, NH₃=ammonia, DEA=diethanolamine.

In these foregoing data, it is apparent that methyldiethanolamine, diethanolamine, dimethylethanolamine and triethanolamine are the most effective bases in the formation of dispersions in that fewer milliequivalents are necessary to form stable dispersions. It should be noted that 40% more morpholine is required that DMEA, DEA, MDE, TEA and 15% more ammonia is required than those same materials. The significance of the minimum usage of base will be apparent from the following experimental results. In each instance, the polyamide polymer after having been treated with base will consist of recurrent units in which a minimum 4% of the carboxylic groups have been neutralized and having the formula:

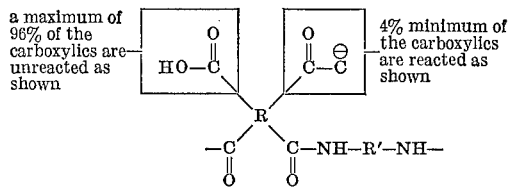

a maximum of 96% of the carboxylics are unreacted as shown

4% minimum of the carboxylics are reacted as shown

Where R and R' are defined under the section referring to the "Anhydride" and "Diamine" respectively (supra). Not all bases react equivalently. For example MDE is superior to morpholine in that less is required to achieve a stable dispersion from which thicker coatings are depositable with the same coulombs.

I formulated dispersions using:

(A)

| | |
|---|---|
| Example 2 | g__ 96 |
| NMP | g__ 74 |
| Ethylene glycol | g__ 44 |
| MDE (2.0 N) | cc__ 3.2 | to which was then added water 110 g.

(B)

| | |
|---|---|
| Example 2 | g__ 96 |
| NMP | g__ 74 |
| Ethylene glycol | g__ 44 |
| Morpholine (2.0 N) | cc__ 4.6 | to which was then added water 110 g.

Rectangular wires (.075" x .95") were immersed to a depth of 2.5 inches.

TABLE II

| Dispersion A | | | Dispersion B | | |
|---|---|---|---|---|---|
| Ma. | Time (sec.) | Solids deposited (g.) | Ma. | Time (sec.) | Solids deposited (g.) |
| 50 | 20 | .0322 | 50 | 20 | .0236 |
| 50 | 20 | .0311 | 50 | 20 | .0232 |
| 50 | 20 | .0309 | 50 | 20 | .0226 |
| 50 | 20 | .0303 | 50 | 20 | .0225 |
| 50 | 20 | .0287 | 50 | 20 | .0221 |
| 30 | 30 | .0246 | 30 | 30 | .0187 |
| 30 | 30 | .0245 | 30 | 30 | .0181 |
| 30 | 30 | .0240 | 30 | 30 | .0185 |
| 30 | 30 | .0235 | 30 | 30 | .0140 |

From the foregoing I conclude that dispersion A produces greater solids deposited than does B under identical conditions.

For a given base material the greater amount of base added to the solution the less electrodeposit will be obtained. For example using material consisting of:

DISPERSION

| | G. |
|---|---|
| Example 5 | 100 |
| NMP | 69 |
| Ethylene glycol | 44 |
| Water | 110 |
| Siloxane sol | 1.53 |

Three preparations were made, the first containing 2 cc., the second containing 2.4 cc., and the third 2.8 cc. of 2 N methyldiethanolamine. The materials are identified as Dispersions A, B and C.

In using these dispersions a rectangular copper wire was coated using stainless steel cathodes which were separated by three inches and copper was placed midway between the two stainless steel electrodes and immersed to a depth of 2.5 inches. The coatings obtained are summarized as follows:

TABLE III

| Dispersion: | Solids deposited in gram | Cured thickness in mils | Current, ma. | Time, sec. |
|---|---|---|---|---|
| A | .0358 | 1.3 | 50 | 15 |
| B | .0322 | 1.1 | 50 | 15 |
| C | .0275 | 1.0 | 50 | 15 |

COMPARISON OF COATING THICKNESS AS A FUNCTION OF PERCENT DISPERSION

Comparing two dispersions having different percent of polymer, the one 5% by weight and the other 10% by weight, less than half the amount of base for the 10% sample is required for the 5% sample in making the respective dispersions. The reduced base requirement for the 5% sample gave much improved electrocoatability as is evident from the following table.

(A) DISPERSION (5%)

| | |
|---|---|
| Example 2 | g__ 95 |
| NMP | g__ 74 |
| Ethylene glycol | g__ 44 |
| Methyldiethanolamine (2.0 N) | cc__ 3.2 | to which is added: water 110 g.

(B) DISPERSION (10%)

| | |
|---|---|
| Example 2 | g__ 151 |
| Ethylene glycol | g__ 20 |
| Methyldiethanolamine (2.0 N) | cc__ 8.0 | to which is added: water 80 g.

The results are:

TABLE V

| Dispersion | Ma. | Seconds | Solids deposited (gram) |
|---|---|---|---|
| A (5%) | 50 | 20 | .0322 |
| | 50 | 20 | .0311 |
| | 50 | 20 | .0309 |
| | 50 | 20 | .0303 |
| | 50 | 20 | .0287 |
| | 30 | 30 | .0245 |
| | 30 | 30 | .0245 |
| | 30 | 30 | .0240 |
| B (10%) | 50 | 20 | .0218 |
| | 50 | 20 | .0196 |
| | 50 | 20 | .0210 |
| | 50 | 20 | .0203 |
| | 50 | 20 | .0196 |
| | 30 | 30 | .0188 |
| | 30 | 30 | .0189 |
| | 30 | 30 | .0189 |
| | 30 | 30 | .0187 |
| | 30 | 30 | .0191 |

ELECTRODEPOSITING APPARATUS

The following examples were electrodeposited with the aid of the apparatus of FIG. 1 indicated by reference numeral 12.

A copper wire anode 14 is submerged in the aqueous dispersion 16. Two spectrographic grade 7.5 mm. size carbon electrodes serve as cathodes 22, 24 and are connected by conductors 28, 30 to an ammeter 32 and a direct current constant power supply 34 with a voltmeter. The power supply 34 is connected in series through conductor 36 to the anode 14.

The anode copper wire 14 is degreased, acid cleaned and water rinsed before coating. The aqueous dispersion is held in an inert container 38 such as glass.

Specific working examples of the resins used are:

Example 1

A reactor equipped with mixing and a cooling jacket was flushed with dry nitrogen, dewpoint −65° C. To the reactor was charged 53,170 g. N-methyl-2-pyrrolidone (<0.01% water), followed by 6954 g. 3,3',4,4'-benzophenonetetracarboxylic dianhydride, B (>99.2% purity).

The agitator was run for a period of 1.0 min. Then 2132 g. of p,p'-methylene dianiline, M (>99.9% purity) was added, slowly, with agitation over a period of 3 min. and the agitation continued for a period of 15 min. forming the BMB precursor, a clear solution with the temperature maintained at 25° C. To the BMB precursor was added slowly, over a period of 15 min. with agitation, 2184 g. of p,p'-methylene dianiline with agitation. During this period the temperature rise was controlled to a max. of 40° C. Agitation was continued for another 30 min. and the product withdrawn as the polyorthoamic acid. The carboxylic acid content was determined by titration in pyridine to a thymol blue end point with t-butylammonium hydroxide. The kinematic viscosity was 2560 cps. at 23.8° C. when reduced to a solids level of 17.5%. The percent imidization was determined to be 0.7∓0.5%, or essentially a negligible amount. The inherent viscosity of this stock polymer solution was determined in N-methyl-2-pyrrolidone at 37.8° C. and found to be 0.64 dl./g. at C.=0.500 g./dl.

Example 2

A polyorthoamic acid prepared according to the recipe and conditions of Example 1 had an inherent viscosity of 0.62 dl./g.

Example 3

To a reactor employed as above was added 200 g. of 17.5% stock solution prepared in Example 1 followed by 30.0 ml. of N-methyl-2-pyrrolidone with agitation. This results in a 15.2% solids solution having a kinematic viscosity of 1150 cps. at 23.8° C. To another 200 g. portion of the stock solution was added, dropwise and with stirring 30.0 ml. of a 1.61% stock solution of 3,3',4,4'-benzophenonetetracarboxylic dianhydride in N-methyl-2-pyrrolidone. This system had a kinematic viscosity of 24,200 cps. at 23.8° C. and an inherent viscosity, measured as above, of 0.89 dl./g.

Example 4

A polyorthoamic acid prepared according to the recipe and conditions of Example 1 had an inherent viscosity of 0.60 dl./g. measured at C.=0.500 g./dl. in NMP at 37.8° C. The imidization level was at 2.0%.

7800 g. of the polyorthoamic acid system was placed in a reactor under nitrogen and equipped with a heating jacket. Then 18.7 g. of BPDA predissolved in 480 g. NMP was added continuously over a period of 5 min. with agitation. Stirring was continued for an additional half hour and the temperature controlled at 38∓3° C. The level of imidization was about 2%. The inherent viscosity for the polyorthoamic acid was 1.10 dl./g. measured at C.=0.500 g./dl. in NMP at 37.8° C.

Example 5

7800 g. of the polyorthoamic acid prepared according to the recipe and conditions of Example 1 was treated with 18.7 g. of BPDA predissolved in 480 g. NMP under conditions cited in Example 4. The level of imidization was about 2%. This inherent viscosity for the polyorthoamic acid was 1.14 dl./g. measured at C.=0.500 g./dl. in NMP at 37.8° C.

Example 6A

The following polyamic acids were prepared at 16% solids:

| | G. |
|---|---|
| Benzophenonetetracarboxylic dianhydride (BPDA) | 32.2 |
| Oxydianiline (ODA) 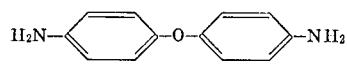 | 19.9 |
| NMP | 273.0 |

Example 6B

| | G. |
|---|---|
| Pyromellitic dianhydride | 21.8 |
| Methylene dianiline | 19.7 |
| NMP | 218.4 |

The blender used for mixing was purged with nitrogen for 5 minutes and then the NMP introduced into same. All of the anhydride was added and stirred for 15 seconds. One half of the respective aniline was added over a 10 second period and then stirred for 15 seconds. This is the BMB precursor. The other half of the aniline was added over a 15 second period and then mixed for 2 minutes.

ELECTROCOATING OF DISPERSION PREPARED FROM EXAMPLE 6A

Attempts were made to make dispersions of this polyamic acid by mixing the following:

20 g. of ODA-BPDA polymer (16% solids, remainder NMP)
20 g. NMP
40 g. $H_2O$

A curd resulted in mixing the above components. The addition of 0.25 cc. of 2.0 N methyldiethanolamine prior to the water addition did not prevent curding of the mixture. When, however, 0.35 cc. of 2 N methyldiethanolamine was used, a stable dispersion resulted. To determine if a dispersion of the Example 6A polymer would electrocoat two dispersions of the Example 6A were prepared. One contained 0.35 cc. of 2 N MDEA and the other 0.50 cc. of 2.0 N MDEA. The samples coated were rectangular copper (.075 x .195) immersed to a depth of 2⅛" in the above dispersion. Samples were coated at 50 ma. for 10 and 20 seconds in each of the dispersions. The following thickness were obtained after curing at 220° C. for 1 hour.

| Example 6A | Example 6A |
|---|---|
| 0.35 cc. of 2.0 N MDEA | 0.50 cc. of 2.0 N MDEA |
| 50 ma., 10 sec.   1.5 mils | 1.3 mils |
| 50 ma., 20 sec.   2.5 mils | 1.8 mils |

The films had excellent flexibility and exhibited excellent corner coverage on the rectangular copper. The thicker films obtained from the dispersion containing less base are typical of the polyamic acid system in general. The foregoing establishes that insufficient amine will cause curding on addition of water and further establishes the desirability of a minimum amount of amine since excessive base addition will cause a thickness reduction as noted by a decrease from 2.5 to 1.8 mils accompanying the increase of the 0.35 cc. MDEA to 0.50 cc. MDEA.

ELECTROCOATING OF DISPERSIONS PREPARED FROM EXAMPLE 6B

Example 6B

Some difficulty was encountered in preparing stable dispersions of the polyamic acid probably the result of a low molecular weight. It took approximately 10 times as much MDEA to form a stable dispersion of the polyamic acid as it did with the BPDA—ODA. A few copper samples were coated from this dispersion and although the film was continuous it was relatively thin (less than 1 mil).

Example 6C

A polyorthoamic acid prepared according to the recipe and conditions of Example 1 had an inherent viscosity of 0.60 dl./g. measured at C.=0.500 g./dl. in NMP at 37.8° C. The imidization level was at 2.0%.

7800 g. of the polyorthoamic acid system was placed in a reactor under nitrogen and equipped with a heating jacket. Then 4.68 g. of BPDA predissolved in 480 g. NMP was added continuously over a period of 5 min. with agitation. Stirring was continued for an additional half hour and the temperature controlled at 38∓3° C. The level of imidization was about 2%. The inherent viscosity for the polyorthoamic acid was 0.83 dl./g. measured at C.=0.500 g./dl. in NMP at 37.8° C.

Data showing "dispersion range" for 5% aqueous dispersion of Example 6C, $\eta=0.83$; 17.3% solids as function of NMP content and degree of neutralization:

TABLE SHOWING DISPERSION RANGE

| NMP/H$_2$O | Percent NMP | Minimum neutralization to form stable dispersion | Neutralization required to form solution |
|---|---|---|---|
| 1 | 50 | 10 | 45 |
| 1.5/1 | 60 | 8 | 28 |
| 1/1.5 | 40 | 15 | 67 |

Example 7

7800 g. of the polyorthoamic acid prepared according to the recipe and conditions of Example 2 was treated with 20.5 g. of BPDA, predissolved in 480 g. NMP under conditions cited in Example 5. Additional NMP was added to reduce the solids content to 15% by weight. The level of imidization was about 2%. The inherent viscosity for the polyorthoamic acid was 1.29 dl./g. measured at C.= 0.500 g./dl. in NMP at 37.8° C.

Example 8

| | G. |
|---|---|
| Example 7 | 219.2 |
| NMP | 30.8 |
| Ethylene glycol | 88.0 |
| n. Butanol | 88.0 | to which was then added 220.0 g. H$_2$O.

The foregoing Example 8 was treated with varying amounts of base (methyldiethanolamine—2 N) prior to H$_2$O addition and the following results obtained:

TABLE VII

| Amt. base, cc. | Percent polymer in dispersed phase | (Dispersion as prepared) resistivity (ohm-cm.) | Neutralized percent COOH | Absolute concentration in wt. percent polymer in continuous phase |
|---|---|---|---|---|
| 2.5 | 85.0 | 28.5 K | 4 | 0.76 |
| 3.9 | 80.0 | 21.0 K | 6 | 0.97 |
| 5.2 | 72.0 | 16.0 K | 8 | 1.39 |
| 6.5 | 70.0 | 12.0 K | 12 | 1.49 |

Example 9

| | G. |
|---|---|
| Example 7 | 110 |
| NMP | 61 |
| H$_2$O | 154 |

To which there was added methyldiethanolamine (2 N) prior to the addition of the 154 g. of water and dispersions produced which gave the following A, B, C dispersions. The dispersions were electrocoated in the manner previously described. The materials were analysed and the results are summarized as Table VIII:

TABLE VIII

| | Methyldiethanolamine 2N, cc. | Percent COOH neutralized | Percent of total polyamic acid polymer in dispersed phase | Concentration of polyamic acid polymer in wt. percent in continuous phase |
|---|---|---|---|---|
| A | 1.7 | 5 | 82.6 | 0.87 |
| B | 2.7 | 8 | 74.6 | 1.27 |
| C | 3.7 | 11 | 69.5 | 1.52 |

GENERAL CONSIDERATION

Resin systems

In general, any polyamide resin can be used to advantage in following the principles of the present invention. The general requirement is that the polyamide acid contain carboxylic units in sufficient amount. The polyamide resin consists of any

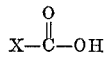

and this is reacted with any Y base:

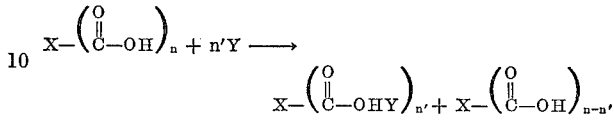

to form upon the addition of water a dispersion, and the ratio of

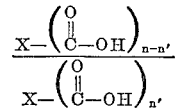

is sufficient to form a partially soluble system in the given organic-water combination solvent. The X stands for any polyamide resin having sufficient recurrent carboxylic pendant units to achieve a ratio of

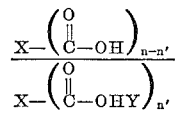

which will render the resin partially water soluble and capable of forming a dispersion upon the addition of water.

It has been found that not substantially less than 4% of the carboxylic units of the polyamic acid can be neutralized without producing a curd upon the addition of water. Thus, enough base must be added so that at least about 4% (and preferably more) of the carboxylic units should be base-reacted prior to the addition of water so that a dispersion will result. The upper limits of base addition are dictated by the minimum proportion of resin which must appear in dispersed phase for best electrocoating results. It has been found that not substantially less than 40% of the total resin content should be in the dispersed or discontinuous phase upon the addition of water. Since the greater amount of base addition, the more soluble is the resin, and hence the less which will appear in dispersed phase, the upper limit of base addition is dictated by the fact that no less than 40% of the total resin content should appear in the dispersed phase upon the addition of water. Thus the upper limit of base addition is dictated by the particular resin system and the minimum practical amount of resin which should be precipitated as a part of the discontinuous dispersed phase upon the water addition.

A still further consideration must be taken into account by those skilled in the art in practicing this invention. This additional consideration relates to the total amount of resin which appears in solution phase at the time of producing the dispersion. Obviously, it is impossible to precipitate all of the resin from solution phase upon the addition of water or else a curd as contrasted from a dispersion, will result and acceptable electrocoating results are not attainable. When the concentration of resin or polymer in solution phase becomes too great, however, then during electrocoating there tends to be a fall-off in maximum thickness that can be attained on the substrate. It is believed, that during electrocoating at least some of the continuous phase resin is electrocoated and when it does so it is believed to deposit as a somewhat denser coating than is the coating obtained from dispersed phase polymer. Whatever the reason, however, I have found that when a greater portion of resin is electrodeposited from solution phase, the benefits of the invention tend to reduce.

In order to avoid the problem described, it is necessary to maintain a relatively low concentration of polyamic acid polymer in the solution phase and preferably such concentration is kept below about 3% by weight of the continuous phase. When the polyamic acid exceeds about 3% by weight of the continuous phase, there is a reduction in the extent to which I can electrodeposit polyamic acid from the dispersed phase and electrodeposited coatings of increased thickness, i.e., greater than about 2 mil total build-up are difficult to attain and hence the benefits of the invention are reduced.

SUMMARY

In summary, for best results, minimum amounts of base should be used and preferably bases which contain alkanol amines, possibly because of their attraction for water.

In the foregoing examples, it will be appreciated that the polyamic acid resins electrodeposited are initially prepared in a suitable organic solvent. In the order of not less than 4% nor more than 80% of the carboxy units are reacted with base material and by then adding water to convert the system from an organic solvent base to a water-organic solvent base material, I thereby create a dispersion of the polymer which is electrodepositable in amounts not heretofore obtained.

In every instance the specific base amount should be a minimum for best results, but the amount used is not critical, the particular amount of base selected being bracketed between two considerations: the amount of base added must not be so slight that when water is added the organic polymer will drop out of solution in the form of curds and the amount of base used must not be so great as to produce less than 40% of the polymer in dispersed phase. Nor should the solution phase of polymer be substantially more than 3% by weight of the continuous phase.

Not all bases are equivalent; for example, alkanol amines are preferred to morpholine. Large molecular weight resins are preferred to lower molecular weight resins since more can be electrodeposited when compared with lower molecular weight resins.

Applying the foregoing teachings, those skilled in the art can consistently obtain high quality resin coatings beyond those heretofore obtained by the prior art.

While I have emphasized the applicability of my coating preparation to the production of magnet wire insulation enamels, it will be appreciated that my invention is also useful in many other areas. For example, the films formed in accordance with my invention may find use in all high temperature insulation applications, such as stator and rotor slot insulators, transformers, cable casings, capacitors, and for various laminating processes. In each case the coating process will provide a low-cost, high-class insulator or bonding agent that can be used in place or existing materials. Other potential uses of my coating preparation of forming water-borne coating solutions with or without minor modifications, will occur to those skilled in the art, and I intend, therefore, in the following claims, to cover all such equivalent variations as fall within the true spirit and scope of this invention.

What I claim as new and desire to secure by Letters Patent of the United States is:

1. A method of preparing an electrodepositable dispersion of polyamic acid in an aqueous-organic liquid medium for use in electrodepositing a polyamic acid coating on an electrically conducting substrate, comprising the sequential steps of:
   (a) preparing a solution of an aromatic polyamic acid in an anhydrous water-miscible organic solvent;
   (b) adding to said polyamic acid solution a base selected from the group consisting of ammonia, an organic amine and mixtures thereof in an amount sufficient to neutralize between about 4% and about 80% of the pendant carboxyl groups of said polyamic acid to render the polyamic acid only partially water soluble; and
   (c) adding water to said base modified polyamic acid solution in an amount sufficient to effect precipitation of at least about 40% of the polyamic acid as a dilute, stable electrodepositable dispersion of polyamic acid in an aqueous-organic liquid medium, the amount of polyamic acid in said aqueous-organic liquid medium being between about 5% and about 10% by weight with the dispersed particles of polyamic acid having a size not substantially greater than 0.5 micron, a coating of polyamic acid being electrodepositable from said medium onto a conductive substrate at a voltage of between about 5 and about 10 volts, to a thickness of between about 1.0 and about 2.5 mils.

2. The method in accordance with claim 1 wherein the aromatic polyamic acid is derived as the reaction product of:

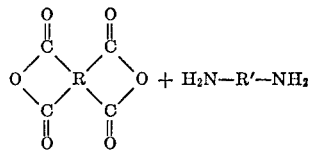

wherein R is an organic tetravalent radical containing at least one ring of 6 carbon atoms and having benzenoid unsaturation, the four carboxyl groups of each unit being attached directly to separate carbon atoms, each pair of carboxyl groups being attached to adjacent carbon atoms of the R radical, and R' is a divalent radical selected from the class consisting of:

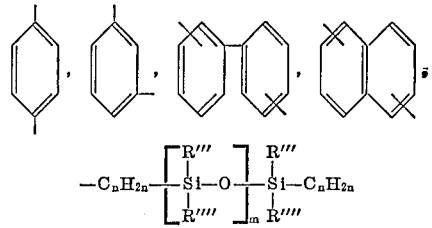

wherein R''' and R'''' are an alkyl or an aryl group having 1 to 6 carbon atoms, $n$ is an integer of from 1 to 4 and $m$ has a value of 0, 1 or more, and

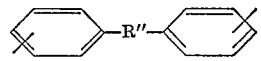

wherein R'' is selected from the group consisting of an alkylene chain having 1-3 carbon atoms,

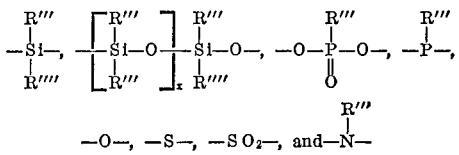

wherein R''' and R'''' are as above-defined and $x$ is an integer of at least 0.

3. The method as defined in claim 1 wherein the base is added to the polyamic acid solution in an amount sufficient to effect the precipitation of polyamic acid in an amount such that the remaining soluble polyamic acid is not substantially greater than about 3% by weight of the aqueous-organic liquid.

4. The method as defined in claim 3 wherein the polyamic acid is the reaction product of at least one aromatic dianhydride and at least one diamine selected from the group consisting of $C_{2-8}$ alkylenediamines, m-phenylene diamine, and diamines having the formula

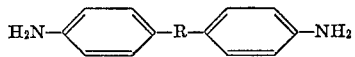

where R is a divalent radical selected from the group consisting of an alkylene having one to three carbon atoms,

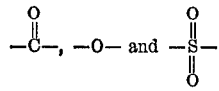

5. The method as defined in claim 4 wherein the water-miscible organic solvent is selected from the group consisting of: dimethylsulfoxide, N-methyl - 2 - pyrrolidone, N - dimethyl-methoxy-acetamide, N-methyl-caprolactam, tetramethylene urea, pyridine, dimethylsulfone, hexamethylphosphoramide, tetramethylenesulfone, formamide, dimethylacetamide, N - methylformamide, butyrolactone, and N-acetyl-2-pyrrolidone.

6. The method defined in claim 5 wherein said base material is a nitrogen containing base selected from the group consisting of: ammonia, dimethylethanolamine, methyldiethanolamine, triethanolamine, triethylamine, diethanolamine, morpholine, and mixtures thereof.

References Cited
UNITED STATES PATENTS

| | | | |
|---|---|---|---|
| 3,230,162 | 1/1966 | Gilchrist | 260—29.2 R |
| 3,335,103 | 8/1967 | Huggard | 260—29.2 VA |
| 3,340,172 | 9/1967 | Huggard | 260—29.2 VA |
| 3,366,563 | 1/1968 | Hart et al. | 260—29.2 VA |
| 3,491,011 | 1/1970 | Le Bras et al. | 260—29.2 VA |
| 3,507,765 | 4/1970 | Holub | 260—29.2 N |
| 3,575,902 | 4/1971 | Tsou | 260—29.2 VA |
| 3,448,068 | 6/1969 | Holub et al. | 260—29.2 N |
| 3,463,712 | 8/1969 | Coates | 204—181 |
| 3,479,310 | 11/1969 | Dieterich et al. | 260—29.2 TN |
| 3,556,972 | 1/1971 | Seitz | 204—181 |

FOREIGN PATENTS 676,155 12/1963 Canada _____ 620—292 VA

OTHER REFERENCES

Le Bras "Electrodeposition" Journal of Paint Technology, vol. 38, No. 493, February 1966, pp. 85–90.

MURRAY TILLMAN, Primary Examiner
A. H. KOECKERT, Assistant Examiner

U.S. Cl. X.R.
204—181; 260—78 TF

UNITED STATES PATENT OFFICE
CERTIFICATE OF CORRECTION

Patent No. 3,766,117                    Dated October 16, 1973

Inventor(s)   James M. McQuade

It is certified that error appears in the above-identified patent and that said Letters Patent are hereby corrected as shown below:

Col 3, line 25, "NMP." should read -- N-methyl-2-pyrrolidone (NMP).--

Col 3, line 36, cancel "(03-LO-4114)"

Col 3, line 49, cancel "(03-LO-3253)"

Col 4, line 49, cancel "(03-LO-3828)"

Col 5, line 10, cancel "X+Y"
Col. 5, line 17, cancel "XY"
Col 5, line 20, "X+Y Y" should read

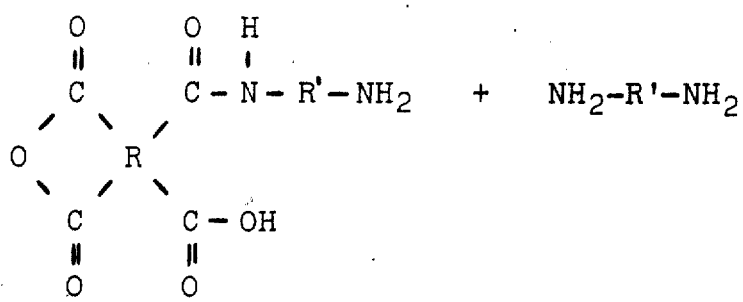

Col. 5, line 25, cancel "YXY"
Col 5, line 72, cancel "(03-LO-4087)"

Col 5, line 72, "Pat. No. 3,652,500" should read --Pat. No. 3,663,510--

UNITED STATES PATENT OFFICE
CERTIFICATE OF CORRECTION

Patent No. 3,766,117  Dated October 16, 1973

Inventor(s) James M. McQuade

It is certified that error appears in the above-identified patent and that said Letters Patent are hereby corrected as shown below:

Col 5, line 73, cancel "Improved"

Col 11, line 62, cancel the heading "Example 6A" and reinsert the same heading following line 65.

Col 14, lines 15-19, that portion of the formula reading $$(\overset{\overset{O}{\|}}{C}-OH)_{n'} \quad \text{should read} \quad (\overset{\overset{O}{\|}}{C}-OHY)_{n'}$$

Col 15, line 54, "or" should read --of--

Col 15, line 55, "coating preparation" should read --method--

Col 16, lines 12 and 13, cancel "at a voltage of between about 5 and about 10 volts,"

Signed and sealed this 14th day of May 1974.

(SEAL)
Attest:

EDWARD M. FLETCHER, JR.
Attesting Officer

C. MARSHALL DANN
Commissioner of Patents